(12) United States Patent
Thompson et al.

(10) Patent No.: US 9,936,629 B2
(45) Date of Patent: Apr. 10, 2018

(54) SECTIONED METERING SYSTEM AND METHOD

(75) Inventors: Dennis George Thompson, Saskatoon (CA); Trevor Lawrence Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 183 days.

(21) Appl. No.: 13/168,745

(22) Filed: Jun. 24, 2011

(65) Prior Publication Data

US 2012/0325131 A1    Dec. 27, 2012

(51) Int. Cl.
*A01C 7/12* (2006.01)
*A01C 7/10* (2006.01)
*A01C 7/08* (2006.01)
*A01C 19/00* (2006.01)

(52) U.S. Cl.
CPC ............ *A01C 7/127* (2013.01); *A01C 7/08* (2013.01); *A01C 7/088* (2013.01); *A01C 7/102* (2013.01); *A01C 7/12* (2013.01); *A01C 7/126* (2013.01); *A01C 19/00* (2013.01); *Y10T 29/49448* (2015.01)

(58) Field of Classification Search
USPC ................... 111/174, 175, 177, 178
See application file for complete search history.

(56) References Cited

U.S. PATENT DOCUMENTS

| | | | |
|---|---|---|---|
| 3,648,631 A * | 3/1972 | Fiedler et al. | 111/120 |
| 4,263,858 A * | 4/1981 | Dreyer | 111/80 |
| 5,003,894 A * | 4/1991 | Lafferty | 111/178 |
| 5,024,173 A * | 6/1991 | Deckler | 111/178 |
| 5,078,066 A | 1/1992 | Lafferty | |
| 6,138,591 A | 10/2000 | Horsch | |
| 6,240,861 B1 | 6/2001 | Memory | |
| 6,598,548 B2 | 7/2003 | Lempriere | |
| 7,305,925 B2 | 12/2007 | Pleyer | |
| 7,565,871 B2 | 7/2009 | Audette | |
| 7,571,688 B1 | 8/2009 | Friestad et al. | |
| 7,690,440 B2 | 4/2010 | Dean et al. | |

FOREIGN PATENT DOCUMENTS

| | | | |
|---|---|---|---|
| CA | 1149235 A | * | 7/1983 |
| DE | 4004967 A1 | | 9/1990 |
| DE | 10154726 A1 | | 5/2003 |

* cited by examiner

*Primary Examiner* — Alicia Torres
(74) *Attorney, Agent, or Firm* — Rebecca L. Henkel; Rickard K. DeMille

(57) ABSTRACT

A sectioned metering system and method is provided. One metering system for distributing an agricultural product in a field includes a drive input and a rotary shaft assembly coupled to the drive input and configured to be driven in rotation by the drive input. The metering system also includes a first metering section driven by the rotary shaft assembly and at least two additional metering sections. Each additional metering section is selectively engageable to drive the respective additional metering section by the rotary shaft assembly. Each additional metering section is also selectively disengageable to interrupt driving of the respective additional metering section by the rotary shaft assembly while the first metering section remains driven.

20 Claims, 6 Drawing Sheets

SECTIONED METERING SYSTEM AND METHOD

BACKGROUND

The invention relates generally to agricultural metering systems and, more particularly, to a sectioned metering system and method.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system configured to deliver metered quantities of product into an airflow that transfers the product to the openers. Certain metering systems are configured to rotate all metering sections of a meter roller assembly collectively. As such, the metering system may be started to enable product delivery to each opener, or stopped to inhibit product delivery to each opener. Other metering systems may enable half of the metering sections to deliver product while the other half are stopped. In such systems, product may be selectively delivered to left and right halves of the seeding implement, for example. With either system, the metering system may deliver product to openers positioned above soil that has already received product, or soil that should not receive product (e.g., a headland), thereby resulting in wasted product.

BRIEF DESCRIPTION

In one embodiment, a metering system for distributing an agricultural product in a field includes a drive input and a rotary shaft assembly coupled to the drive input and configured to be driven in rotation by the drive input. The metering system also includes a first metering section driven by the rotary shaft assembly and at least two additional metering sections. Each additional metering section is selectively engageable to drive the respective additional metering section by the rotary shaft assembly. Each additional metering section is also selectively disengageable to interrupt driving of the respective additional metering section by the rotary shaft assembly while the first metering section remains driven.

In another embodiment, a metering system for distributing an agricultural product in a field includes a drive input and a rotary shaft assembly coupled to the drive input and configured to be driven in rotation by the drive input. The metering system also includes a live center metering section driven by the rotary shaft assembly and two clutchable side metering sections disposed on opposite sides of the live center metering section. Each side metering section is selectively engageable to drive the respective side metering section by the rotary shaft assembly. Each side metering section is also selectively disengageable to interrupt driving of the respective side metering section by the rotary shaft assembly while the center metering section remains driven.

In another embodiment, a method of manufacturing an agricultural product metering system includes coupling a first metering section to a rotary shaft assembly. The rotary shaft assembly is configured to be driven in rotation by a drive input. The method also includes coupling at least two additional metering sections to the rotary shaft assembly via clutch assemblies. Each additional metering section is selectively engageable to drive the respective additional metering section by the rotary shaft assembly. Each additional metering section is also selectively disengageable to interrupt driving of the respective additional metering section by the rotary shaft assembly while the first metering section remains driven.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of sectioned metering systems and methods are provided. Unlike prior metering systems directed toward operating separate sections of a metering system, e.g., Memory, (U.S. Pat. No. 6,240,861), the embodiments described below pertain to a metering system with a live center section and selectively engageable side meter sections. For example, in certain embodiments, a metering system includes a drive input, and a rotary shaft assembly coupled to the drive input and configured to be driven in rotation by the drive input. The metering system also includes a first metering section driven by the rotary shaft assembly and at least two additional metering sections. Each additional metering section is selectively engageable to drive the respective additional metering section by the rotary shaft assembly. Further, each additional metering section is selectively disengageable to interrupt driving of the respective additional metering section by the rotary shaft assembly while the first metering section remains driven. Consequently, the center metering section will rotate whenever the rotary shaft assembly is rotated, and the side metering sections may be selectively rotated based on a desired product flow to various openers within a seeding implement.

Figure 1:
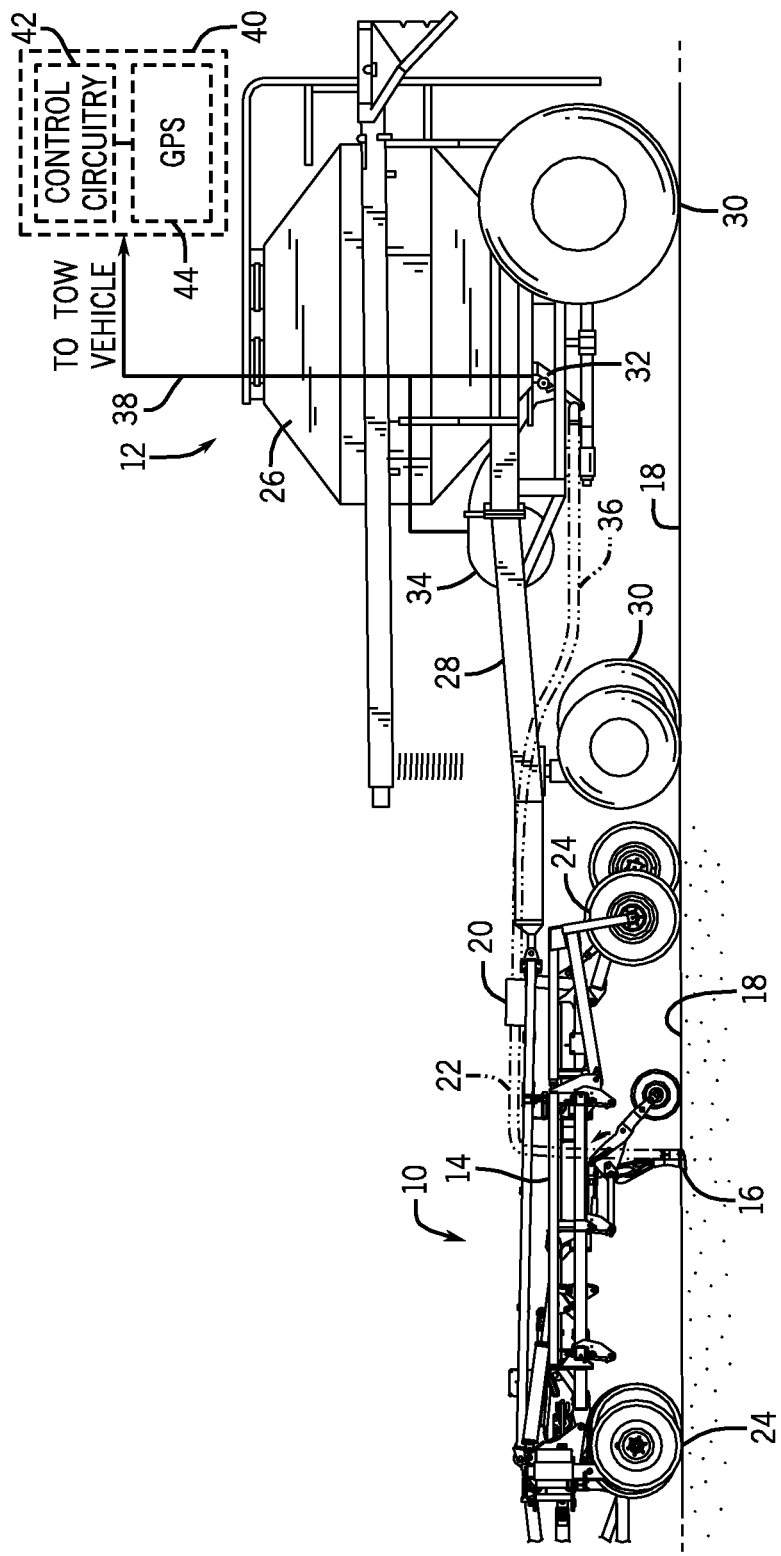
FIG. 1 is a side view of an air cart which may employ an embodiment of a sectioned metering system.

FIG. 1 is a side view of an air cart, which may employ an embodiment of a sectioned metering system. In the illustrated embodiment, an implement 10 is coupled to an air cart 12. The implement 10 includes a tool frame 14 having a ground engaging tool 16. The ground engaging tool 16 is configured to penetrate soil 18 for seed and/or fertilizer deposition into the soil. The ground engaging tool 16 receives product (e.g., seeds, fertilizer, etc.) from a product distribution header 20 via a hose 22. As illustrated, the hose 22 extends from the product distribution header 20 to the ground engaging tool 16 to facilitate product flow to the tool.

Although only one ground engaging tool 16, product distribution header 20, and hose 22 are included in the illustrated embodiment, it should be appreciated that the implement 10 may include additional tools 16, headers 20, and/or hoses 22 in alternative embodiments. For example, in certain embodiments, the implement 10 may include one or more distribution headers having multiple hoses extending to respective ground engaging tools 16. In the illustrated embodiment, the implement 10 includes wheel assemblies 24 which contact the soil surface 18 and support the implement 10 during operation and transport.

The air cart 12 includes a storage tank 26, a frame 28, wheels 30, a metering system 32, and an air source 34. In certain configurations, the storage tank 26 includes multiple compartments for storing various flowable particulate materials. For example, one compartment may include seeds, and another compartment may include a dry fertilizer. In such configurations, the air cart 12 is configured to deliver both the seeds and fertilizer to the implement 10. The frame 28 includes a towing hitch configured to couple to the implement 10 or a tow vehicle. As illustrated, the air cart 12 is coupled to the implement 10 via the frame 28. Consequently, the air cart 12 is towed behind the implement 10 during planting operations and during transport. In alternative embodiments, the air cart 12 may be towed directly behind a tow vehicle, with the implement 10 towed behind the air cart 12.

In the present embodiment, seeds and/or fertilizer within the storage tank 26 are gravity fed into the metering system 32. The metering system 32 includes sectioned meter rollers to regulate the flow of material from the storage tank 26 into an air flow provided by the air source 34. The air flow then carries the material through a hose 36 to the implement 10, thereby supplying the ground engagement tool 16 with seeds and/or fertilizer for deposition within the soil. Although only one hose 36 is included in the illustrated embodiment, it should be appreciated that multiple hoses may be utilized within alternative embodiments. Furthermore, the hoses 36 extending from the air cart 12 to the distribution headers 20 may have a larger diameter than the hoses extending from the distribution headers 20 to each ground engaging tool 16. For example, the hoses extending to the distribution headers may have a diameter of about 2.5 inches, while the hoses extending to each ground engaging tool 16 may have a diameter of about 1.0 inches.

In the illustrated embodiment, a communication bus 38 communicatively couples a control assembly 40 to the metering system 32 and to the air source 34. The communication bus 38 enables power and control signals to be provided to the metering system 32 and to the air source 34 to control their operation. In certain embodiments, the control assembly 40 may be located on the tow vehicle. However, in other embodiments, at least part of the control assembly 40 may be located on the air cart 12. The control assembly 40 includes control circuitry 42 and a spatial locating system, such as the illustrated Global Positioning System (GPS) receiver 44. The control circuitry 42 provides control signals to the air cart 12 and may receive geographical position information from the GPS receiver 44 to determine a geographical position of the metering system 32 or the air cart 12. As such, the control circuitry 42 may implement "Smart Farming," in which the control circuitry 42 controls the metering system 32 based on the geographical position of the metering system 32.

Figure 2:
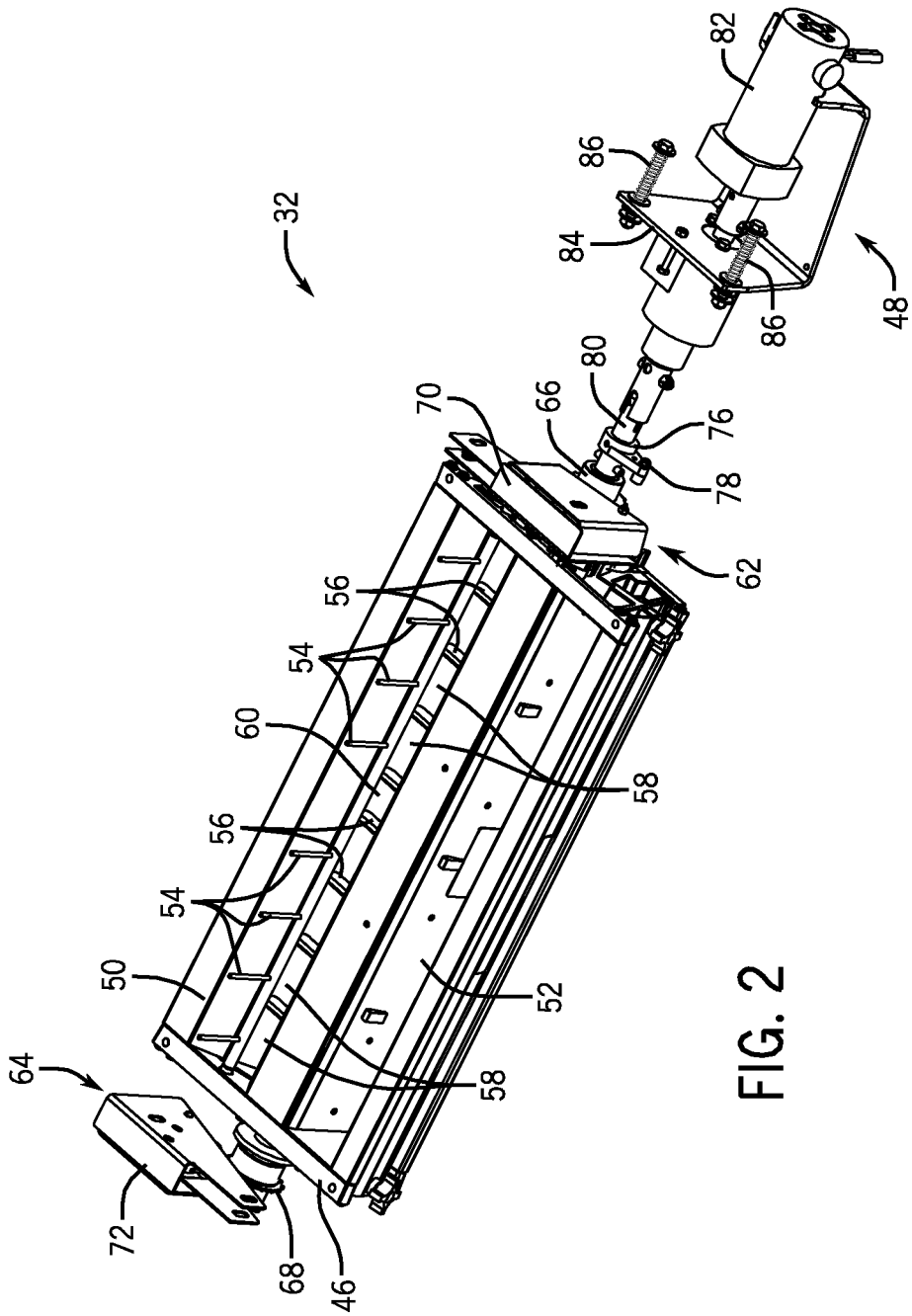
FIG. 2 is a perspective view of an embodiment of a sectioned metering system that may be employed within the air cart of FIG. 1.

FIG. 2 is a perspective view of an embodiment of a sectioned metering system 32. As illustrated, the metering system 32 includes a housing assembly 46 and a drive input assembly 48. The housing assembly 46 is divided into a product entry section 50 and an air entry section 52. When installed in an air cart, the product entry section 50 is positioned beneath a storage tank of the air cart to enable product to enter the metering system 32. Agitators 54 extend from the metering system 32 and protrude into the storage tank. The agitators 54 are configured to move back and forth to loosen product, and cause the product to drop into the metering system 32, thereby reducing the possibility of product becoming stuck in the storage tank. Vanes 56 within the product entry section 50 establish meter boxes 58 that direct product to individual meter rollers within the meter boxes 58. The vanes 56 also establish a coupling section 60, which is positioned between a first group of four meter boxes 58 on the left side of the coupling section 60, and a second group of four meter boxes 58 on the right side of the coupling section 60. Product flows from a storage tank into the individual meter boxes 58 where rotating meter rollers regulate product flow through the metering system 32. Air enters the air entry section 52 and combines with the metered product, thereby establishing an air/product mixture that exits the metering system 32.

Clutch assemblies 62 and 64 are located external to the housing assembly 46 on opposite sides of the housing. The clutch assemblies 62 and 64 include clutches 66 and 68, and solenoid assemblies 70 and 72, respectively. Specifically, the first clutch assembly 62 includes a first clutch 66 and a first solenoid assembly 70, while the second clutch assembly 64 includes a second clutch 68 and a second solenoid assembly 72. The clutches 66 and 68 are configured to selectively engage metering sections (e.g., groups of meter rollers). For example, when the clutches 66 and 68 are engaged, respective meter rollers associated with each clutch will be driven to rotate. Conversely, when the clutches 66 and 68 are disengaged, the respective meter rollers will stop rotation. The clutches 66 and 68 may be any type of suitable clutch, such as a wrap spring clutch or an electric clutch. For example, in certain embodiments, clutches manufactured by Warner Electric of South Beloit, Ill. may be employed within the metering system 32. The solenoid assemblies 70 and 72 are configured to selectively engage a respective clutch based on reception of a control input (e.g., electrical input, pneumatic input, hydraulic input, etc.).

The clutches 66 and 68 may be configured to be engaged by default when the drive shaft rotates. In such a configuration, the drive shaft rotates and causes the spring in the clutch to hold the clutch to the drive shaft. To disengage one of the clutches 66 and 68, a control latch is activated by the respective solenoid assembly 70 or 72 which causes the latch to engage a tooth on a sprocket of the clutch being disengaged. Contact between the latch and the tooth blocks rotation of the sprocket, thereby inducing the clutch to disengage (e.g., via unwinding of a spring that holds the clutch to the drive shaft). As a result, rotation of the respective meter roller section will stop, while the drive shaft continues to rotate, thereby inhibiting product delivery to a corresponding section of the seeding implement. The disengaged clutch can be reengaged by activating the respective solenoid assembly 70 or 72 to cause the latch to disengage the tooth on the sprocket of the. With one or more of the clutches 66 and 68 engaged, product is directed to the corresponding section of the seeding implement. For example, during operation, a portion of the seeding implement may pass over soil that does not need product. In such a condition, the control system and/or operator may disengage one or more of the clutches 66 and 68 that correspond to product delivery to the portions of the seeding implement above the region that does not require product.

An agitator drive assembly 76 is coupled to the metering system 32 adjacent to the first clutch assembly 62 via a fastener 78. In certain embodiments, the agitator drive assembly 76 is coupled to the agitators 54 to facilitate movement of the agitators 54 when the rotary shaft is rotated. Furthermore, a coupler 80 is connected to the agitator drive assembly 76, and configured to transfer torque between the drive assembly 48 and the drive shaft. The drive assembly 48 includes a motor 82 to drive the drive shaft, thereby inducing the meter rollers to rotate. The drive assembly 48 also includes a mounting bracket 84 with fasteners 86 to enable the drive assembly 48 to be secured to an air cart. Although an electric motor 82 is employed within the illustrated embodiment, it should be appreciated that other devices, including pneumatic motors, hydraulic motors, or a gear/clutch assembly configured to drive the shaft via rotation of the air cart wheels, may be employed in alternative embodiments. In certain embodiments, multiple drive assemblies 48 may be used in place of the multiple clutch assemblies 62 and 64 (e.g., the multiple drive assemblies 48 may be used to selectively drive each meter section).

To meter product from the metering system 32, an operator or control system may instruct the drive assembly 48 to begin rotating the meter rollers of metering system 32. In certain embodiments, the metering system 32 may rotate at a rate selected by the operator or by the control system. As the metering system 32 rotates, sections of the metering system may be selectively engaged or disengaged by the operator or the control system to enable or inhibit product from being metered through the selected metering system section or sections.

Figure 3:
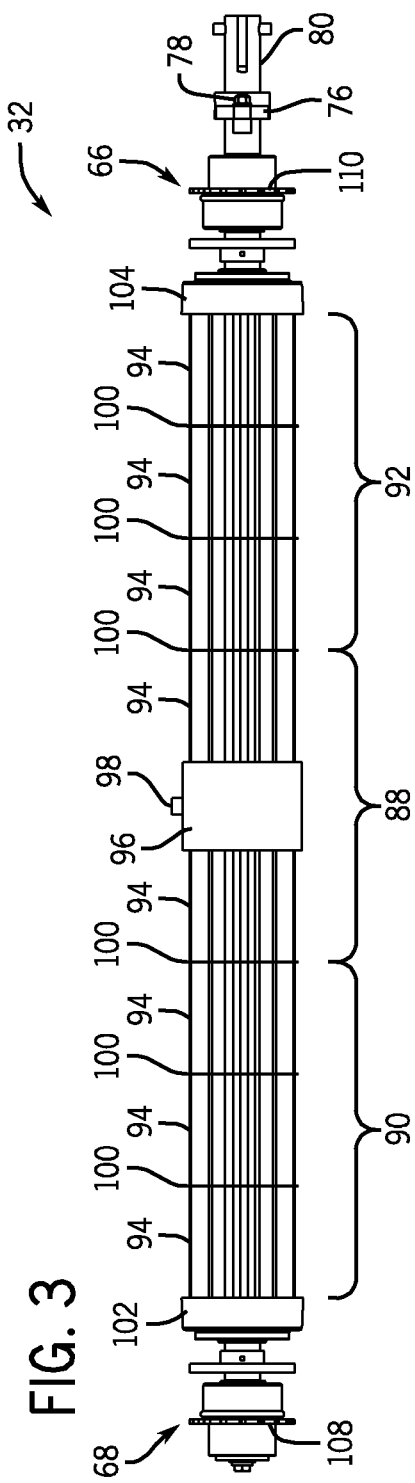
FIG. 3 is a side view of an embodiment of a sectioned meter roller assembly that may be employed within the sectioned metering system of FIG. 2.

FIG. 3 is a side view of an embodiment of a sectioned meter roller assembly that may be used within the metering system 32 of FIG. 2. As illustrated, the meter roller assembly includes a center section 88, a first side section 90, and a second side section 92. In the illustrated embodiment, the center section 88 is live, i.e., the center section 88 is directly connected to the drive shaft such that rotation of the drive shaft induces the center section 88 to rotate. While the illustrated center section 88 includes two meter rollers 94, it should be appreciated that the center section 88 may include additional meter rollers (e.g., four, six, eight, or more) in alternative embodiments. As illustrated, the center section 88 includes a coupler 96 positioned between meter rollers 94 of the center section 88, and attached to a central shaft with a fastener 98. The meter rollers 94 are separated from one another by divider plates 100 which direct product to the individual meter rollers 94. The divider plates 100 may be made of metal, such as stainless steel, for example. According to certain embodiments, the divider plates 100 may be between approximately 0.015 to 0.025 inches thick. For example, the divider plates 100 may be approximately 0.02 inches thick. In the illustrated embodiment, the first and second side sections 90 and 92 each include three meter rollers 94. However, in alternative embodiments, the first and second side sections 90 and 92 may include more or fewer meter rollers 94 (e.g., 1, 2, 3, 4, 5, or more). As previously discussed, during operation of the metering system 32, the meter rollers 94 are driven to rotate, thereby metering a desired quantity of product to the ground engaging tools.

A first bearing assembly 102 is positioned laterally outward from the first side section 90, and a second bearing assembly 104 is positioned laterally outward from the second side section 92. The bearing assemblies 102 and 104 are configured to engage a housing of the metering system 32, thereby facilitating rotation of the meter roller assembly. In addition, the first clutch 66 includes a first sprocket 110, and the second clutch 68 includes a second sprocket 108. As previously discussed, the clutches 68 and 66 may be engaged to induce rotation of the first and second side sections 90 and 92, and disengaged to stop rotation of the first and second side sections 90 and 92. To disengage each clutch, a control latch is activated by a solenoid assembly (not shown) which causes the latch to engage one of the teeth of the sprocket. Contact between the latch and the tooth blocks rotation of the sprocket, thereby inducing the clutch to disengage (e.g., via unwinding of a spring that holds the clutch to the drive shaft). As a result, rotation of the respective meter roller section will stop, while the drive shaft continues to rotate.

For example, if the second clutch 68 is engaged and the drive shaft is rotating, the first side section 90 will rotate. Conversely, if the second clutch 68 is disengaged by a latch engaging one of the teeth of the second sprocket 108, the first side section 90 will not rotate despite rotation of the drive shaft (i.e., the clutch will decouple the first side section 90 from the drive shaft). However, because the center section 88 is live, the center section 88 will continue to rotate when the clutch 68 is disengaged. Likewise, if the first clutch 66 is engaged and the drive shaft is rotating, the second side section 92 will rotate. Conversely, if the first clutch 66 is disengaged, the second side section 92 will not rotate despite rotation of the drive shaft.

Figure 4:
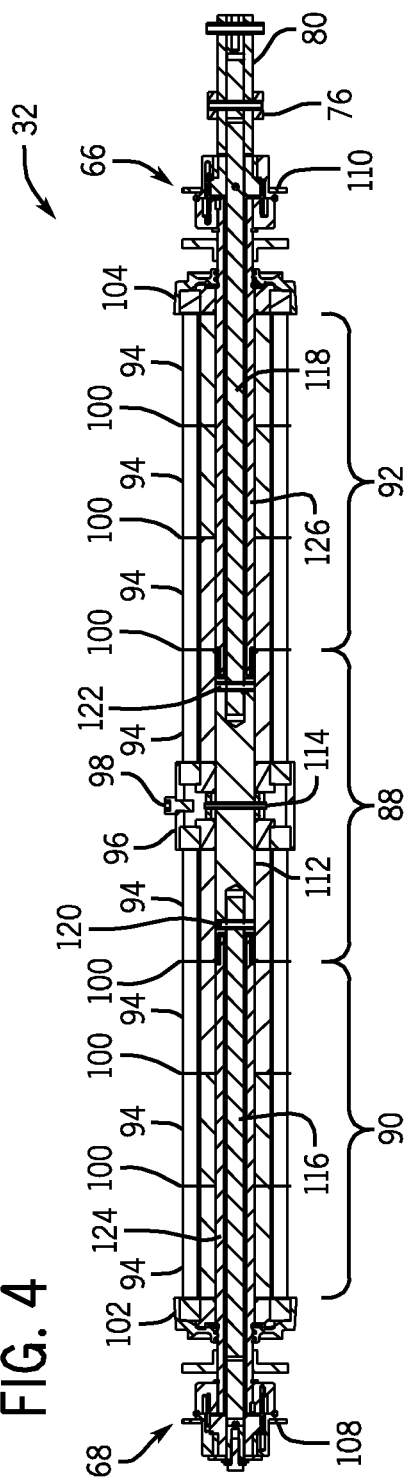
FIG. 4 is a cross-sectional view of the sectioned meter roller assembly of FIG. 3.

FIG. 4 is a cross-sectional view of the sectioned meter roller assembly of FIG. 3. As illustrated, a center hex shaft 112 extends through the center section 88. The center section 88 is coupled to the center hex shaft 112 via an assembly that includes a pin 114 extending through the center hex shaft 112 to the coupler 96. Further, two meter rollers 94 are coupled to opposite ends of the center hex shaft 112, thereby positioning each meter roller 94 on opposing sides of the coupler 96. The center hex shaft 112 is configured to interface with a hexagonal shaped opening of the two meter rollers 94 to rotationally couple the shaft to the rollers. Shaft portions 116 and 118 are pinned to the center hex shaft 112 via pins 120 and 122, respectively, creating a rotary shaft assembly. Thus, either shaft portion 116 or 118 may be rotated by a drive input to cause the center hex shaft 112 to rotate. Because the center hex shaft 112 is coupled to the meter rollers 94 and to the coupler 96, rotation of the hex shaft 112 will induce the center section 88 to rotate. According to certain embodiments, the shaft portions 116 and 118 may be approximately 0.5 inches in diameter.

The first side section 90 includes a side hex shaft 124 with three meter rollers 94 disposed about the hex shaft 124. Further, the hex shaft 124 has a hollow interior to enable the shaft portion 116 to rotate within the hex shaft 124. Likewise, the second side section 92 includes a side hex shaft 126 with three meter rollers 94 disposed about the hex shaft 126. The hex shaft 126 also has a hollow interior to enable the shaft portion 118 to rotate within the hex shaft 126. The first clutch 66 is configured to selectively couple the side hex shaft 126 to the shaft portion 118, thereby transferring torque between the shaft portion 118 and the side hex shaft 126. Consequently, the second side section 92 will rotate when the drive shaft is rotating and the first clutch 66 is engaged. Similarly, the second clutch 68 is configured to selectively couple the side hex shaft 124 to the shaft portion 116, thereby transferring torque between the shaft portion 116 and the side hex shaft 124. As a result, the first side section 90 will rotate when the drive shaft is rotating and the second clutch 68 is engaged. Therefore, the metering side sections 90 and 92 are selectively engageable to control product delivery to various sections of the seeding implement. In addition, because the center section 88 is live, the center section 88 will meter product as long as the driver shaft is rotating.

In certain embodiments, the metering system 32 may be coupled to a spatial locating system. In such embodiments, the metering system 32 will receive control signals to engage or disengage the clutches 66 and 68 based on a geographical position of the metering system. Engaging or disengaging the clutches 66 and 68 results in meter rollers 94 either rotating or not rotating. When meter rollers 94 are rotating, product is delivered to the corresponding section of the implement. For example, control circuitry may be programmed with a geographically defined seeding location, such as a field to be planted. With the coordinates in the control circuitry, the control circuitry will instruct the metering system 32 to only deposit seeds in the desired locations (e.g., seed flow to the left side of the implement may be stopped by disengaging the clutch that corresponds to meter rollers for the left side when the left side is positioned above a portion of the field that has already been seeded). Thus, the control circuitry will substantially reduce the possibility of delivering product to undesirable regions of the field (e.g., headlands), or delivering product to regions of the field that have already received product. As a result, the product will be applied more efficiently to the field. In other embodiments, the metering system 32 may be controlled manually from a tow vehicle operator.

In certain embodiments, the metering system 32 may include four separately controlled metering sections. For example, a drive unit may be attached to each side of a drive shaft assembly. The drive shaft assembly may be configured to enable each side to be rotated separately via the two drive units (i.e., the center coupling assembly does not rigidly pin both sides of the drive shaft together). Further, each side section may include a clutch assembly to selectively engage one subsection of each side section, thereby providing a metering system with four independently controllable metering sections.

In another embodiment, the metering system 32 may be similar to the system just described, with four separately controlled metering sections and a center coupling assembly that does not rigidly pin both sides of the drive shaft together. The metering system 32 may be driven by a single drive unit rotating one side of the drive shaft. The opposite side of the drive shaft may be driven using a cross shaft attached to the drive unit and operable by engaging a clutch to cause the cross shaft to rotate the second side of the drive shaft. Furthermore, a subsection of each side section may have a clutch assembly that can be selectively engaged. Thus, there may be four separately controlled metering sections with one drive unit.

Figure 5:
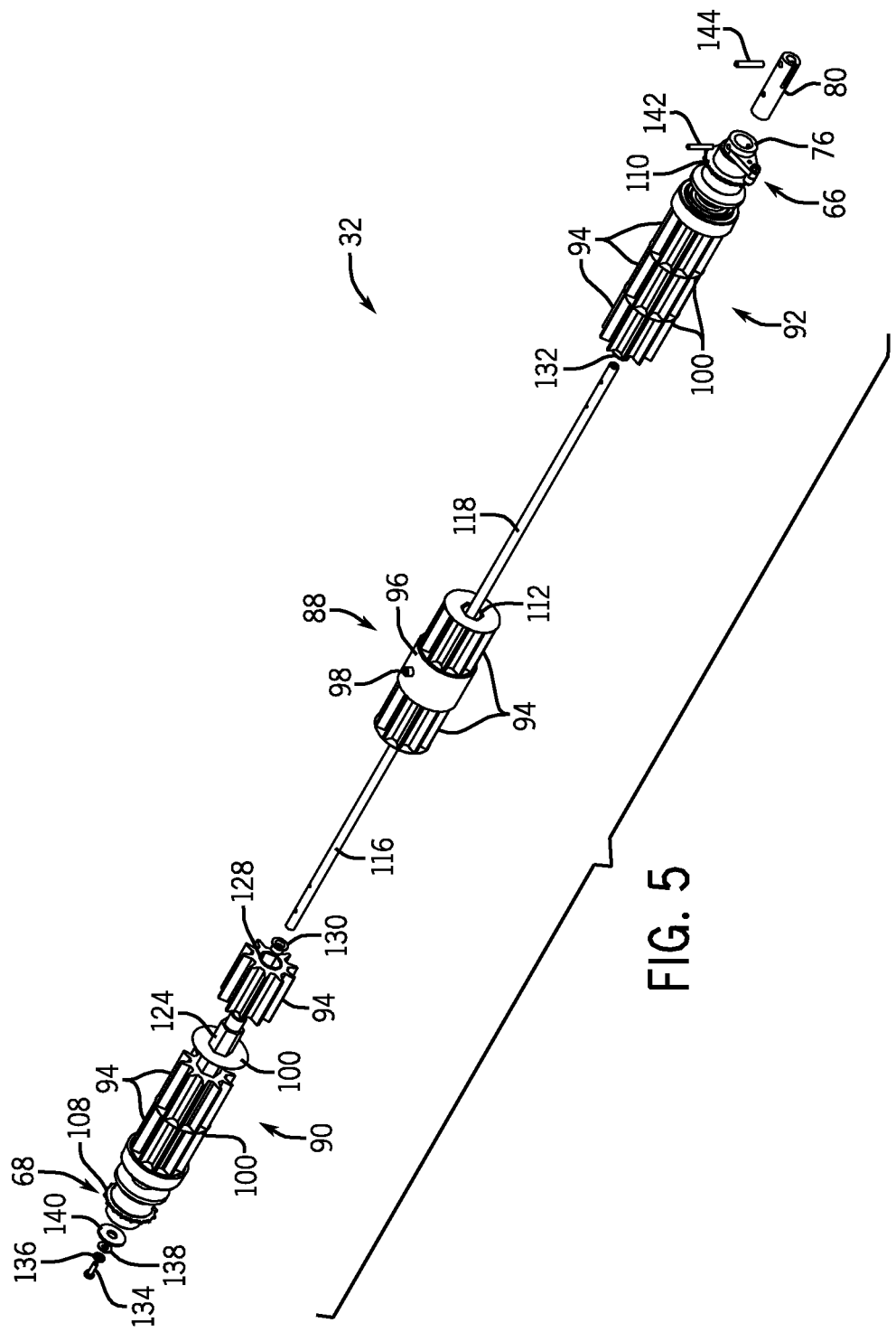
FIG. 5 is an exploded view of the sectioned meter roller assembly of FIG. 3.

FIG. 5 is an exploded view of the sectioned meter roller assembly of FIG. 3. As illustrated, the center section 88 is assembled with shaft portions 116 and 118 attached. In the illustrated embodiment, the first side section 90 includes meter rollers 94 having a hex shaped interior 128. The hex shaped interior 128 enables the meter rollers 94 to rotationally couple to the side hex shaft 124. As previously discussed, divider plates 100 are positioned between the meter rollers 94. Flanged bushings 130 and 132 are inserted into the hollow side hex shafts 124 and 126 to support the drive shaft, and to facilitate rotation of the drive shaft. The meter roller assembly also includes a bolt 134 configured to be inserted through a lock washer 136 and washers 138 and 140. Once the bolt has engaged the shaft portion 116 (e.g., via a threaded connection), the first side section 90 will be secured to the center section 88. On the other side of the assembly, a pin 142 may be inserted through the agitator drive assembly 76, the coupler 80, and the shaft portion 118 to secure the agitator drive assembly 76 to the coupler 80 and to the shaft portion 118. In addition, a pin 144 may be employed to couple the coupler 80 to the shaft portion 118. Thus, when a drive assembly is attached to the coupler 80, the drive assembly will drive the shaft 118 to rotate.

Figure 6:
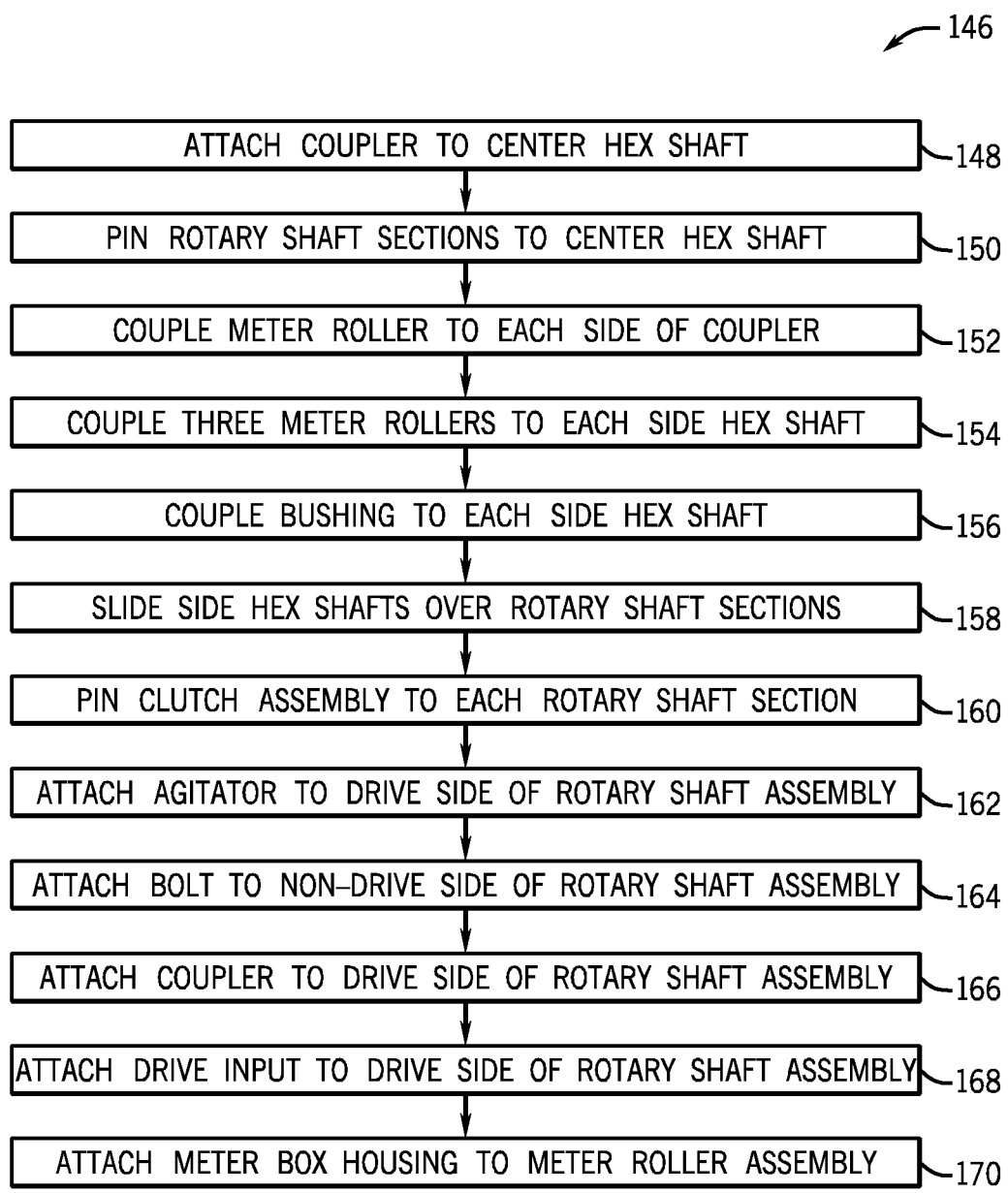
FIG. 6 is a flow chart of an embodiment of a method of manufacturing a sectioned metering system.

FIG. 6 is a flow chart of an embodiment of a method 146 of manufacturing a sectioned metering system. At step 148, a coupler is attached to a center hex shaft, such as with fasteners or pins. Then, at step 150, side rotary shaft sections are pinned to the center hex shaft to secure the shaft sections to the center hex shaft. Next, at step 152, a meter roller is coupled to the center hex shaft on each side of the coupler, thus forming a center metering section. At step 154, three meter rollers are coupled to one side hex shaft, and three other meter rollers are coupled to a second side hex shaft. Then, at step 156, a flanged bushing is coupled to each side hex shaft to enable the side shafts to rotate independently from the center hex shaft and to provide support to the side hex shafts. Next, at step 158, the side hex shafts slide over the rotary shaft sections.

At step 160, a clutch assembly is pinned or otherwise attached to each side rotary shaft section such that the side sections may be selectively engaged to the center hex shaft. Then, at step 162, an agitator assembly is attached to the drive side of the rotary shaft assembly. As previously discussed, the agitator assembly enables product flowing to the metering system to be disturbed across the metering sections, and to dislodge accumulations on the metering system. Next, at step 164, a bolt is attached to the non-drive side of the rotary shaft assembly to secure the side hex shaft to the center metering section. At step 166, an adapter coupler is attached to the drive side of the rotary shaft assembly to enable the drive shaft to attach to a drive input. Then, at step 168, a drive input is attached to the drive side of the rotary shaft assembly to cause the drive shaft to rotate. Next at step 170, a meter box housing is attached to the meter roller assembly.

Figure 7:
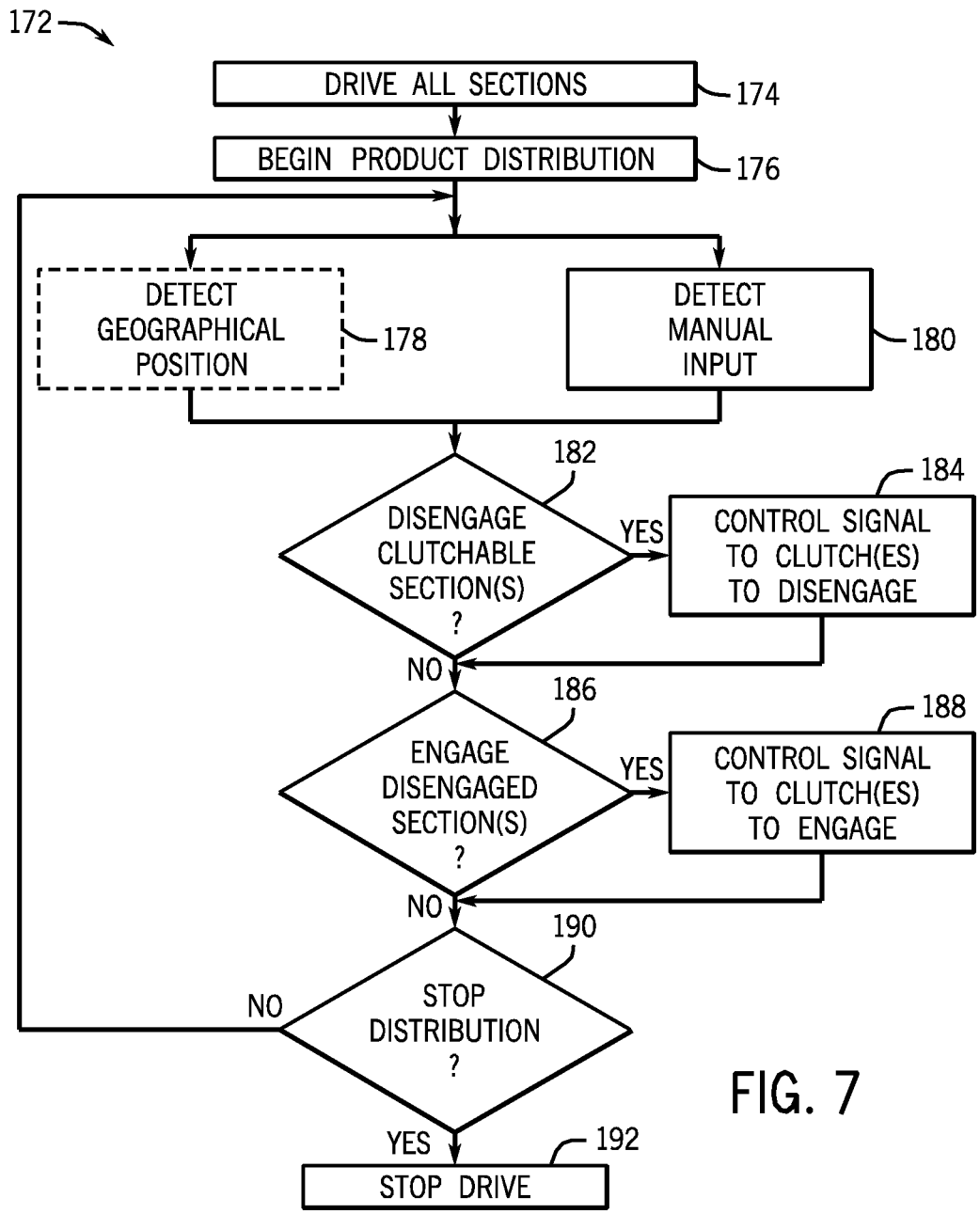
FIG. 7 is a flow chart of an embodiment of a method of operation of a sectioned metering system.

FIG. 7 is a flow chart of an exemplary method 172 of operation of a sectioned metering system. At step 174, all sections of the metering system are driven to rotate by a drive input, such as a drive motor assembly. Then, at step 176, as the meter roller sections are driven to rotate, the metering system begins product distribution to the implement. From step 176, the method may either continue to step 178 or step 180. At step 178, a spatial locating system may detect a geographical position of the metering system. A control system may then determine whether product should be deposited at the detected geographical position. Alternatively, at step 180, the metering system may detect a manual input from an operator, such as a selection via a user interface to engage or disengage a section of the meter roller assembly. Next, at step 182, the control system determines whether it should disengage clutchable section(s). If the control system determines that clutchable section(s) should be disengaged, the control system will send a control signal to the clutch(es) to disengage the clutch(es), as represented by step 184. For example, if an operator or a control system desires to disengage the clutch of a first side section, the control system will send a control signal to a solenoid to cause the clutch of the first side section to disengage. By disengaging the clutch of the first side section, the meter rollers of the first side section will stop rotating and inhibit product delivery to the corresponding portion of the implement.

Next, at step 186 the system determines whether it should engage disengaged section(s). If the control system determines that certain clutchable section(s) should be engaged, the system will send a control signal to the clutch(es) to engage the clutch(es), as represented by step 188. For example, if an operator or a control system desires to engage the clutches of two side sections, the control system will send control signals to solenoids to cause the clutches of the two side sections to engage. By engaging the clutches, the meter rollers that correspond to the clutches will rotate and deliver product to corresponding portions of the implement. Next, at step 190 the system determines whether it should stop distribution of product. If product distribution should continue, the method returns to either step 178 or 180. If termination of product distribution is desired, the system will stop driving the sections at step 192.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A metering system for distributing an agricultural product in a field, comprising:
   a rotary shaft assembly configured to couple to a drive input assembly and to be driven in rotation by the drive input assembly;
   a first metering section driven by the rotary shaft assembly;
   at least two additional metering sections, each additional metering section of the at least two additional metering sections being selectively engageable to drive the respective additional metering section by the rotary shaft assembly, and disengageable to interrupt driving of the respective additional metering section by the rotary shaft assembly while the first metering section remains driven, wherein the first metering section is disposed between the at least two additional metering sections;
   a common housing containing the first metering section and the at least two additional metering sections therein, wherein the first metering section and the at least two additional metering sections collectively comprise a unit configured to operate as a whole while the at least two additional metering sections are engaged with the rotary shaft assembly, and wherein the first metering section comprises a live center section configured to rotate while the rotary shaft assembly rotates, and the at least two additional metering sections are configured to be selectively rotated while the rotary shaft assembly rotates;
   a first hollow shaft at least partially surrounding the rotary shaft assembly on a first side of the live center section and a second hollow shaft at least partially surrounding the rotary shaft assembly on a second side of the live center section opposite the first side of the live center section, wherein a first additional metering section of the at least two additional metering sections is coupled to the first hollow shaft and a second additional metering section of the at least two additional metering sections is coupled to the second hollow shaft, the first hollow shaft is driven by the rotary shaft assembly when the first hollow shaft is engaged to the rotary shaft assembly, and the second hollow shaft is driven by the rotary shaft assembly when the second hollow shaft is engaged to the rotary shaft assembly; and
   a first clutch disposed at a longitudinal end of the first additional metering section opposite the live center section, and a second clutch disposed at a longitudinal end of the second additional metering section opposite the live center section, wherein each clutch is engageable to transmit torque between the rotary shaft assembly and the respective additional metering section, the rotary shaft assembly extends through the first clutch, and a portion of the rotary shaft assembly positioned on an opposite side of the first clutch from the first additional metering section is configured to couple to the drive input assembly; and
   a coupling assembly configured to couple the first metering section to the rotary shaft assembly, wherein the first metering section comprises a plurality of meter rollers that are configured to rotate while the rotary shaft assembly rotates, and a first meter roller of the plurality of meter rollers is positioned on a first side of the coupling assembly and a second meter roller of the plurality of meter rollers is positioned on a second side of the coupling assembly, opposite the first side.

2. The metering system of claim 1, wherein the rotary shaft assembly extends through the first metering section and the at least two additional metering sections.

3. The metering system of claim 1, wherein each clutch comprises a wrap spring clutch.

4. The metering system of claim 1, wherein the at least two additional metering sections are independently engageable to be driven by the rotary shaft assembly.

5. The metering system of claim 1, wherein each of the at least two additional metering sections comprises a respective plurality of meter rollers, each of the at least two additional metering sections comprising more meter rollers than the first metering section.

6. The metering system of claim 1, wherein the metering system is configured to alter the number of the at least two additional metering sections metering product based upon a geographical position of the metering system obtained from a spatial locating system.

7. The metering system of claim 6, wherein the spatial locating system comprises a Global Positioning System receiver.

8. A metering system for distributing an agricultural product in a field, comprising:
   a drive input assembly;
   a rotary shaft assembly coupled to the drive input assembly and configured to be driven in rotation by the drive input assembly;
   a live center metering section driven by the rotary shaft assembly;
   two clutchable side metering sections disposed on opposite sides of the live center metering section, each side metering section of the two clutchable side metering sections being selectively engageable to drive the respective side metering section by the rotary shaft assembly, and disengageable to interrupt driving of the respective side metering section by the rotary shaft assembly while the live center metering section remains driven;
   a common housing containing the live center metering section and the two clutchable side metering sections therein, wherein the live center metering section and the two clutchable side metering sections collectively comprise a unit configured to operate as a whole while the two clutchable side metering sections are engaged with the rotary shaft assembly, and wherein the live center metering section is configured to rotate while the rotary shaft assembly rotates, and the two clutchable side metering sections are configured to be selectively rotated while the rotary shaft assembly rotates;

a first hollow shaft at least partially surrounding the rotary shaft assembly on a first side of the live center metering section and a second hollow shaft at least partially surrounding the rotary shaft assembly a second side of the live center metering section opposite the first side of the live center metering section, wherein a first clutchable side metering section of the two clutchable side metering sections is coupled to the first hollow shaft and a second clutchable side metering section of the two clutchable side metering sections is coupled to the second hollow shaft, the first hollow shaft is driven by the rotary shaft assembly when the first hollow shaft is engaged to the rotary shaft assembly, and the second hollow shaft is driven by the rotary shaft assembly when the second hollow shaft is engaged to the rotary shaft assembly;

a first clutch disposed at a longitudinal end of the first clutchable side metering section opposite the live center metering section, and a second clutch disposed at a longitudinal end of the second clutchable side metering section opposite the live center metering section, wherein each clutch is engageable to transmit torque between the rotary shaft assembly and the respective clutchable side metering section, the rotary shaft assembly extends through the first clutch, and a portion of the rotary shaft assembly positioned on an opposite side of the first clutch from the first clutchable side metering section is coupled to the drive input assembly; and a coupling assembly configured to couple the live center metering section to the rotary shaft assembly, wherein the coupling assembly is positioned between a first meter roller of the live center metering section and a second meter roller of the live center metering section.

9. The metering system of claim 8, wherein the two clutchable side metering sections are independently engageable to be driven by the rotary shaft assembly.

10. A method of manufacturing an agricultural product metering system, comprising:

coupling a first metering section to a rotary shaft assembly via a coupling assembly such that a first meter roller of the first metering section is positioned on a first side of the coupling assembly and a second meter roller of the first metering section is positioned on a second side of the coupling assembly that is opposite the first side, and wherein the rotary shaft assembly is configured to be driven in rotation by a drive input assembly;

coupling at least two additional metering sections to the rotary shaft, each additional metering section of the at least two additional metering sections being selectively engageable to drive the respective additional metering section by the rotary shaft assembly, and disengageable to interrupt driving of the respective additional metering section by the rotary shaft assembly while the first metering section remains driven, wherein the at least two additional metering sections are disposed on opposite sides of the first metering section;

disposing the first metering section and the additional metering sections within a common housing, wherein the first metering section and the additional metering sections collectively comprise a unit configured to operate as a whole while the additional metering sections are engaged with the rotary shaft assembly, and wherein the first metering section comprises a live center section comprising the first meter roller and the second meter roller and configured to rotate while the rotary shaft assembly rotates, and the additional metering sections are configured to be selectively rotated while the rotary shaft assembly rotates;

disposing a first hollow shaft at least partially around the rotary shaft assembly on a first side of the live center section and disposing a second hollow shaft at least partially around the rotary shaft assembly a second side of the live center section opposite the first side of the live center section, wherein a first additional metering section of the at least two additional metering sections is coupled to the first hollow shaft and a second additional metering section of the at least two additional metering sections is coupled to the second hollow shaft, the first hollow shaft is driven by the rotary shaft assembly when the first hollow shaft is engaged to the rotary shaft assembly, and the second hollow shaft is driven by the rotary shaft assembly when the second hollow shaft is engaged to the rotary shaft assembly;

coupling a first clutch to the rotary shaft assembly at a longitudinal end of the first additional metering section opposite the live center section such that the rotary shaft assembly extends through the first clutch, and coupling a second clutch to the rotary shaft assembly at a longitudinal end of the second additional metering section opposite the live center section, wherein each clutch is engageable to transmit torque between the rotary shaft assembly and the respective additional metering section; and coupling a portion of the rotary shaft assembly positioned on an opposite side of the first clutch from the first additional metering section to the drive input assembly.

11. The method of claim 10, wherein coupling the portion of the rotary shaft assembly to the drive input assembly comprises coupling the portion of the rotary shaft assembly to a coupler and coupling the coupler to the drive input assembly.

12. The method of claim 11, wherein coupling the portion of the rotary shaft assembly to the coupler comprises disposing a pin through respective openings in the coupler and the portion of the rotary shaft assembly.

13. The metering system of claim 1, comprising a coupler configured to couple the portion of the rotary shaft assembly to the drive input assembly.

14. The metering system of claim 13, comprising a pin configured to couple the coupler to the portion of the rotary shaft assembly.

15. The metering system of claim 8, comprising a coupler configured to couple the portion of the rotary shaft assembly to the drive input assembly.

16. The metering system of claim 15, comprising a pin configured to couple the coupler to the portion of the rotary shaft assembly.

17. The metering system of claim 1, comprising a divider plate positioned between the first meter roller of the first metering section and a respective meter roller of the first additional metering section of the at least two additional metering sections.

18. The metering system of claim 1, wherein the coupling assembly comprises a coupler and a pin that extends through the rotary shaft assembly to the coupler.

19. The method of claim 10, wherein coupling the first metering section to the rotary shaft assembly via the coupling assembly comprises coupling a coupler of the coupling assembly to a center shaft of the rotary shaft assembly, positioning the first meter roller of the first metering section on the first side of the coupler, and positioning the second meter roller of the first metering section on the second side of the coupler.

20. The method of claim 19, wherein coupling the coupler of the coupling assembly to the center shaft of the rotary shaft assembly comprises coupling the coupler to the center shaft via a fastener or a pin.

* * * * *